(No Model.)
C. NOYES, Jr.
AXLE BOX.
No. 552,389. Patented Dec. 31, 1895.
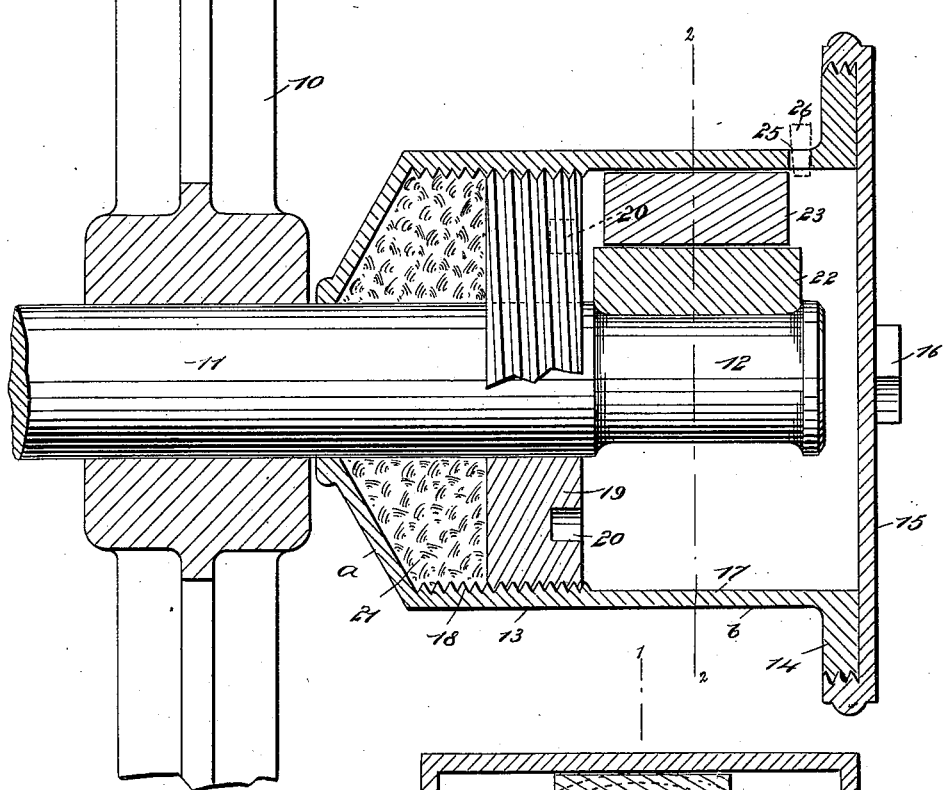
*fig: 1.*
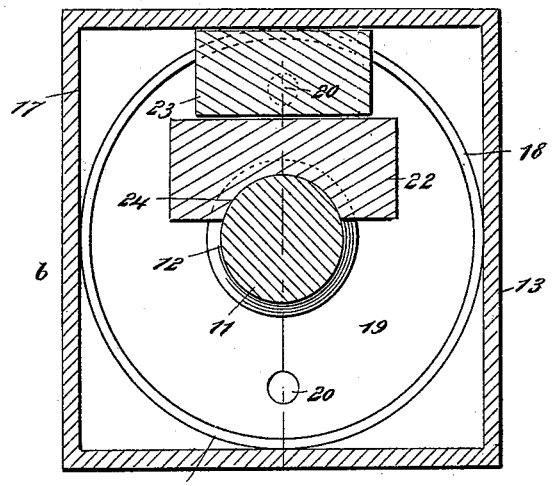
*fig: 2.*
WITNESSES:
Chas. Niole.
J. B. Owens.
INVENTOR
C. Noyes Jr.
BY
Munn & Co.
ATTORNEYS.

UNITED STATES PATENT OFFICE.

CAROLUS NOYES, JR., OF VALLEY FALLS, RHODE ISLAND.

AXLE-BOX.

SPECIFICATION forming part of Letters Patent No. 552,389, dated December 31, 1895.

Application filed May 28, 1895. Serial No. 550,974. (No model.)

*To all whom it may concern:*

Be it known that I, CAROLUS NOYES, Jr., of Valley Falls, in the county of Providence and State of Rhode Island, have invented a new and Improved Axle-Box, of which the following is a full, clear, and exact description.

The object of this invention is to provide an axle-box in which it will be unnecessary to surround the neck of the axle and its bearing blocks or brasses with waste, such as is used in the ordinary axle-box, and to produce a construction which will make it possible to use oil merely, which shall cover the axle and a part of the bearing-blocks, so as to effect that lubrication essential to such devices. This object I attain by means of the mechanism illustrated in the accompanying drawings, all of which will be fully described hereinafter and finally embodied in the claims.

Reference is to be had to the accompanying drawings, forming a part of this specification, in which similar characters of reference indicate corresponding parts in both figures.

Figure 1 is a longitudinal section of the box constructed after the manner of my invention and taken on the line 1 1 of Fig. 2, and Fig. 2 is a cross-section on the line 2 2 of Fig. 1.

The reference-numeral 10 indicates a portion of the wheel, to which the axle 11 is affixed in the usual or any preferred manner. The axle 11 has one end projected beyond the wheel 10 and formed with a neck 12 such as is common in car-axles.

13 indicates the axle-box, which comprises a frusto-conical or tapering inner portion $a$ and square outer portion $b$, the said outer portion having at its end an annular rib 14 which is screw-threaded and which has the cap 15 screwed thereon. The cap 15 is capable of hermetically sealing the end of the box 13, which is otherwise open and has on its outer side and centrally therewith a square projection 16 which is used to permit the screwing up of the cap, as will be understood.

The interior of the box and at its outer half is formed square, as indicated by the numeral 17, while the remainder of the interior is round and screw-threaded, as indicated by the numeral 18. The round and internally-threaded portion 18 is adapted to have the packing-ring 19 screw therein, and the said ring is peripherally threaded, so as to operate with the threads on the part 18, and formed with openings 20 therein whereby a suitable tool may be connected with the ring to screw it in place. The ring 19 operates to confine the oakum or other packing 21 in the inner end of the box 13, and this oakum or other packing fills the conical portion $a$ and lies snugly around the axle, so as to prevent the passage of air and fluid. Thus it will be seen that by screwing up the ring 19 against the oakum 21 the oakum will be forced into the conical space $a$ and held in place, as is necessary to the invention.

Arranged in the square portion 17 of the box 13, and seated upon the neck 12 of the axle, are the bearing blocks or brasses 22 and 23. The block 22 is provided on its under side with a concave portion 24 which receives the neck of the axle and makes the block secure thereon, while the block 23 is mounted on the plane upper face of the block 22 and engages therewith and with the under side of the box top, as shown in the drawings. It will be understood that the weight of the car is placed upon the box 13 directly over the blocks 22 and 23, so that the strain of said weight will be communicated to the blocks and then to the axle, as is common in all axle-boxes.

Formed in the upper side of the box 13, and communicating with the square portion 17, is an opening 25 which is adapted to permit the introduction of a lubricant into the part 17 of the box and which may be closed by means of a plug 26, or any other suitable device. It will be observed that the threaded rib 14 at the outer end of the box permits the circular cap 15 to be connected to the box without enlarging the same, and it will also be observed that this cap and its arrangement with the box is such as to make a thoroughly fluid-tight connection, the same being essential to my invention.

In assembling the parts the ring 19 and oakum 21 are first placed in position around the axle 11, after which the block 22 is seated upon the neck 12 of the axle and the key or companion block 23 moved longitudinally with the axle, so as to rest upon the block 22 and engage with the upper side of the part 17 of the box. The cap 15 should now be placed on its rib 14, whereupon the space 17 of the box will be fluid-tight and capable of holding the lubricant for the axle. The lubricant may now be introduced through the opening 25 and allowed to rise to a point above the concave bottom 24 of the block 22, so as to completely submerge the axle. It will be observed that by means of a bearing-box constructed after the manner of my invention, the entry of dirt and grit into the bearing-containing parts is absolutely impossible, and that owing to the use of oil only, many advantages are attained. The plug 26 is preferred for the opening 25, to the end that it may be readily removed when filling is necessary, and by its means the opening may be automatically uncovered should gases generate in the part 17. This opening of the orifice 25 will be effected by the blowing out of the plug, as will be understood.

Having thus described my invention, I claim as new and desire to secure by Letters Patent—

1. An axle box having a square interior portion contiguous to a round and reduced inner portion, the said round portion being internally threaded, a packing ring co-operating with the round portion and screw threaded to engage with the threads thereof, the outer end of the box having an annular rib and a cap capable of closing the outer end of the box, substantially as described.

2. An axle box, having a square interior portion contiguous to a round and internally threaded portion, a packing ring co-operating with the round portion, bearing blocks resting upon the axle and engaging the upper side of the box, the outer end of the box being open and having an annular and threaded rib projected therefrom, and a screw cap having a lateral flange, the same being internally threaded and co-operating with the rib of the box, substantially as described.

3. An axle box having a square interior portion contiguous to a rounded interior portion, a packing ring within said rounded portion and closing the adjacent end of the box, and a screw cap closing the opposite or outer end of the box, substantially as described.

CAROLUS NOYES, JR.

Witnesses:
A. T. KIRBY,
B. H. RAMSDELL.